Patented Aug. 7, 1945

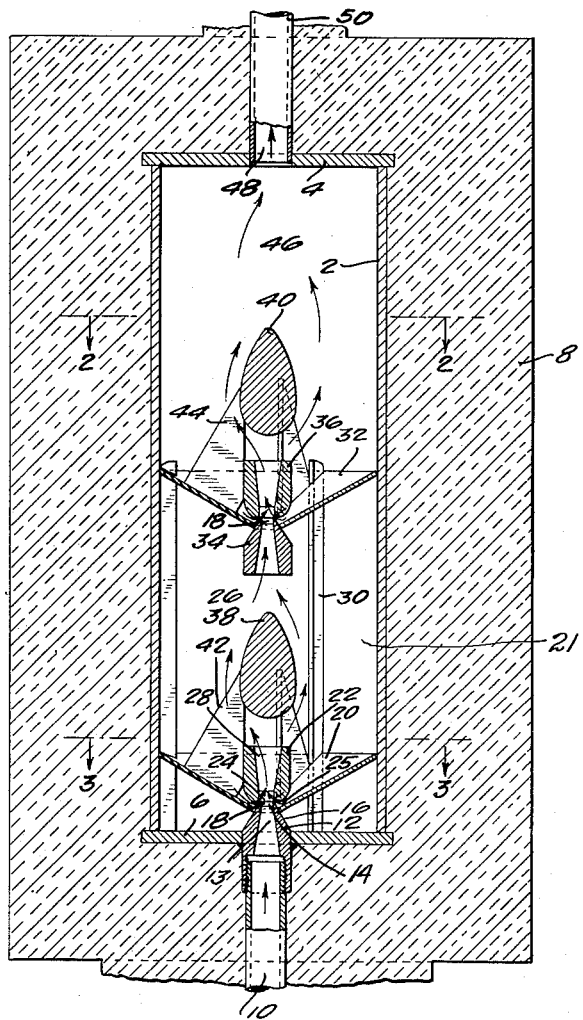
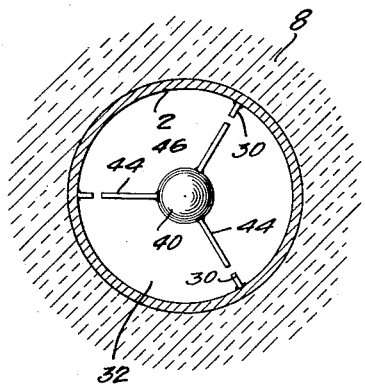
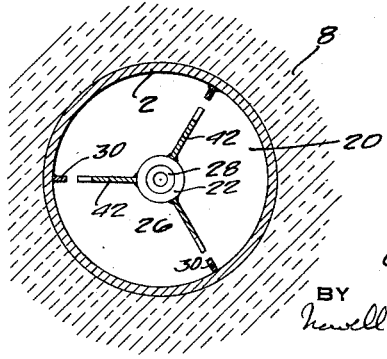

2,381,119

UNITED STATES PATENT OFFICE 2,381,119

PROCESSES OF FACILITATING AND CONTROLLING CHEMICAL REACTIONS OR PHYSICAL TREATMENTS

Gilbert D. Dill, Wilmette, Ill., assignor to Standard Oil Development Company, New York, N. Y., a corporation of Delaware Application June 20, 1940, Serial No. 341,478

1 Claim. (Cl. 34—10)

This invention relates to processes of facilitating and controlling chemical reactions or physical treatments in which the reagents or substances involved in the reaction or treatment must be subjected to a thorough commingling and interaction to insure complete reaction or treatment and has particular utility in chemical reactions or physical treatments in which one or more finely divided solids are involved.

In chemical reactions which involve either a reaction between two finely divided solids or a reaction between a finely divided solid and a fluid, and also in physical treatments of finely divided solids, difficulty is usually experienced in bringing about such an interaction, either between the particles of the two solids or between the particles of the solid and the particles of the fluid, that the desired, and sometimes required, speed of reaction or of physical treatment can be obtained, or even a dependably uniform and complete reaction or physical treatment.

The present invention has for its general object an improved process of and apparatus for effecting, in a predetermined and controlled manner, such a thorough commingling and interaction, either of two finely divided solids with each other or of a fluid and a finely divided solid or of two fluids with each other, that rapid, effective and properly controlled chemical reactions or physical treatments, and particularly those in which finely divided solids are involved, may be brought about without waste of energy or of materials. The invention relates particularly to the facilitation and control of chemical reactions or physical treatments in which a gas or a vapor is employed in a dual capacity in the reaction or physical treatment.

Among the chemical reactions or physical treatments, to the facilitation and control of which the present invention lends itself, are reduction reactions, either of the type in which finely divided ores are reduced by means of finely divided solid-reducing agents, such as carbon, or of the type in which the reduction of the finely divided ores is effected by means of fluid-reducing agents, such as carbon monoxide gas, hydrogen or hydrocarbons, catalytic processes in which the catalyst is in a finely divided state, partial reduction processes, such as those sometimes employed as steps in ore beneficiating processes, impregnation processes, such, for example, as processes of impregnating finely divided ores with carbon preparatory to reduction, and gas reforming processes. Other chemical reactions and physical treatments to the facilitation and control of which the invention can readily be applied will suggest themselves to those skilled in the art.

As hereinabove suggested, the invention relates particularly to the facilitation and control of chemical reactions or physical treatments in which a gas or a vapor is employed in a dual capacity in the reaction or physical treatment and an important object of the invention is the direction and control of the gas or vapor to perform its plurality of functions.

By reference to the hereinabove given illustrative list of chemical reactions and physical treatments to the facilitation and control of which the invention lends itself, it will be seen that the gas or vapor taking part in the reaction or treatment may be primarily either a reagent, or a means for producing a physcial condition favoring the reaction, or a carrier for a reagent or for some material used in effecting a physical treatment, etc. An important object of the present invention, therefore, is to produce such a controlled and directed state of turbulence in the gas or vapor employed in the reaction or treatment that, in addition to performing its primary function, the gas or vapor, by entraining the particles of a finely divided solid with it in its turbulent movements, will insure such commingling and interaction of the solid particles with the fluid particles and with each other as to insure a rapid, effective and readily controlled chemical reaction or physical treatment.

An important feature of the invention, in its application to the facilitation and control of reactions or physical treatments in which finely divided solids are involved, is the utilization of means for so confining and directing the fluid, preferably either a gas or a vapor, which is to participate in the reaction or other treatment involving a finely divided solid, that the fluid moves upwardly under a substantially constant flow-impelling pressure and in its upward travel is forced through sharply contrasted zones of increased velocity and reduced pressure and of reduced velocity and increased pressure to produce the desired turbulence, the finely divided solid being introduced into this fluid stream in such manner that it will partake of the turbulence therein thus created.

The invention contemplates introducing the finely divided solid into the fluid stream either so that its overall travel is in the same direction as the fluid stream or so that its overall travel is counter to the direction of flow of the fluid stream. The invention further contemplates recycling a portion of the fluid stream, and of any of the solid particles entrained therein, from the zone of high pressure and low velocity again through the zone of low pressure and high velocity further to insure the desired commingling and interaction of the solid particles and the fluid particles with each other.

Further to insure a thorough commingling and interaction of the fluid and the solid particles with each other, the invention contemplates so baffling the fluid stream, and particularly in the vicinity of the point of its discharge from the zone of high velocity and low pressure into the zone of low velocity and high pressure, as to contribute still more to the turbulent effect. An important feature of the invention is the use of a streamlined baffle to aid in securing a selective action, particularly when recycling, an important feature of the invention, as a whole, being its capacity for so classifying the materials being acted upon, during their passage through the apparatus, that those requiring more extended treatment will receive it.

Although, as hereinabove suggested, this invention has especial utility in the facilitation and control of chemical reactions and physical treatments in which finely divided solids are involved it is also useful for insuring a thorough commingling and interaction of two fluids, either two gases, two liquids, a gas and a liquid or a gas and a vapor as, for example, in the reformation, by means of steam, of a hydrocarbon containing gas into a substantially hydrocarbon free gas having, as its principal constituents, hydrogen and carbon monoxide.

One of the fields in which the novel process of the present invention have found particular utility is in the field of catalytic reactions in which intimate and prolonged contact between a gas or vapor and a powdered catalyst at an elevated temperature is desired.

Where a powdered solid is contacted with a liquid or vapor, for example in catalytically cracking petroleum hydrocarbons, it is difficult to keep the mixture of powdered solid and liquid or vapor homogeneous due to the difference in gravity and the tendency of the solid to separate from the liquid or vapor. This is especially true when the powdered solid catalyst and the liquid or vapor are introduced together into a reaction chamber. In such case the solid usually tends to separate from the liquid or vapor and thereby the total beneficial effect of the catalytic solid is not obtained.

A particular object of the invention, therefore, is to provide a reaction chamber wherein a definite volume of powdered catalyst will be intimately contacted with a definite volume of the vapor for a definite period of time. A further object of the invention is to provide means for insuring recirculation of portions of the vapor and the powdered catalyst.

Other objects and important features of the invention will appear from the following description and claim, when considered in connection with the accompanying drawing, in which two forms of apparatus for practicing the novel process of the present invention are illustrated, this application as to common subject-matter being in part a continuation of my co-pending application Serial No. 244,612, filed December 8, 1938.

Figure 1 is a diagrammatic sectional view of apparatus suitable for practice of the novel process of the present invention;

Figure 2 is a section on the line 2—2 of Figure 1;

Figure 3 is a section on the line 3—3 of Figure 1.

In the form of the invention shown in Figures 1 to 3 inclusive, the chamber or chambers in which the reaction or physical treatment is to take place, hereinafter referred to as "reaction" chambers, may be enclosed within a cylindrical side wall 2 and top and bottom walls 4 and 6. To conserve heat, when the heat for the reaction or physical treatment is supplied by preheating the substances taking part in the reaction or physical treatment, the entire casing may be enclosed within an insulating covering 8. It will, of course, be understood that in some cases, instead of supplying the entire heat for the reaction or physical treatment by preheating the substances or elements taking part therein, the casing in which the reaction chamber, or chambers, is located may be heated in any other suitable manner.

The fluid which is to take part in the reaction and/or physical treatment within the reaction chamber or chambers, or which is to entrain the elements or substances which are to react or take part in the physical treatment, is introduced into the lower end of the lower reaction chamber, two chambers being shown. The conduit for the fluid comprises a straight section of tubing 10 to the upper end of which is connected one section 12 of a venturi, the section 12 having a comparatively steeply tapering interior passage 13 to produce the desired increase in velocity and reduction in pressure of the inflowing fluid.

At its upper end the interior passage in the section 12 terminates in a cylindrical throat 14. The outer face 16 of the upper end of the section 12 is also conical and tapers to meet the interior passage in a comparatively sharp edge 18, the tapered upper end of the section 12 extending through the bottom of an inverted frusto-conical partition or baffle 20 in the casing 2, which forms the bottom of the reaction chamber 21 and serves as a hopper-like structure to direct the fluid and any entrained solid to be recirculated to the low pressure part of the venturi, more fully to be described hereinafter.

Positioned above the upper end of the section 12 of the venturi is a section 22 in which is formed the expansion end of the venturi, the section 22 having at its lower end a bell-mouthed opening 24 of an internal conical taper substantially corresponding to the external conical taper of the outer face 16 of the section 12 and being spaced from the tapered upper end of the section 12 sufficiently to provide an annular passage 25 from the reaction chamber 21 into the passage through the Venturi section 22. The conical or bell-mouthed lower end 24 of the passage through the section 22 of the Venturi structure connects at its upper end with the expansion part 26 of the venturi which, at its upper end, discharges into the reaction chamber 21.

From the foregoing description, it will be seen that a fluid entering the pipe 10 and flowing under a substantially uniform flow-impelling pressure will, as it is forced through the contracting passage 13 in the section 12, travel, under the well-known law of the flow of fluids, at an increased velocity but at a reduced pressure through the throat 14 at the upper end of the passage 13 and will be projected into the bell mouth 24 in the section 22 at this increased velocity. Although the bell mouth 24 is slightly larger in diameter than the throat 14, there will be no substantial opportunity for expansion of the fluid until it enters the expansion end 28 of the passage through the section 22 of the Venturi structure, at which point its velocity will begin to drop and its pressure begin to build up. There will thus be, in the confined flow of the fluid, a region of low pressure with which the annular passage 25 between the tapered upper end of the section 12 and the inner wall of the bell mouth 24 communicates, thus creating a suction tending to draw the surrounding fluid into this passage for recirculation together with any finely divided solids that may be entrained in the fluid.

Where the conical upper end of the section 12 projects through the bottom opening in the frusto-conical partition or baffle 20, the fit of the conical end of the section 12 within the opening is preferably a fluid-tight fit and, if desired, these parts may be permanently connected together. At its outer edges the frusto-conical partition member or baffle 20 fits tightly within the cylindrical casing member 2 and may, if desired be permanently secured thereto or may be bodily removable therefrom. As herein shown, the partition member 20 is preferably connected to spacer bars 30 received in marginal recesses in the outer edge of the member 20, these spacer bars 30 being also connected to a second partition member 32 of the same general construction as the partition member 20. Connected to the partition member 32 and extending through an opening in the bottom thereof in the same manner as the Venturi section 12 is the Venturi section 34 which cooperates with a Venturi section 36 located above the partition member 32 in the same manner as the Venturi section 12 cooperates with the Venturi section 22 of the lower chamber 21.

Located above the expansion ends of the respective venturis are baffles 38 and 40 which are preferably stream-lined in shape, the baffle 38 being supported by three brace members 42 connected at their upper ends to the baffle and at their lower ends to the inner face of the partition member 20 and the baffle 40 being supported by similar brace members 44 connected thereto and to the partition member 32 in the same manner. The Venturi sections 22 and 36 are also shown as supported in their proper relations to the sections 12 and 34, respectively, by connections to the respective sets of brace members 42 and 44.

It will be obvious from the foregoing description that, if desired, the lower partition member 20 might constitute the lower end of the casing, since the space in the casing 2 bounded by the partition member 20 and the end wall 6 serves no functional purpose in the operation of the device. As shown, the partition members 20 and 32 and the end wall 4 define, with the cylindrical casing wall 2, two reaction or treatment chambers 21 and 46.

Having regard to the foregoing description of the apparatus, it will be seen that, when employed to facilitate and control a reaction between a powdered catalytic solid and a fluid, such for example as petroleum oil vapor, and the catalytic solid, entrained in the oil vapor, is introduced into the lower reaction chamber 21 through the tube 10, Venturi section 12 and Venturi section 22, the petroleum vapor as it passes through the restricted part of the venturi will have its velocity increased and its pressure reduced and as it emerges from the enlarged upper end of the venturi into the chamber 21 its velocity will be reduced while its pressure will increase correspondingly. It will, nevertheless, emerge from the venturi at a considerable velocity as compared with its overall rate of travel through the chamber 21 of comparatively large diameter.

As the mixture of vapor and powdered catalytic solid, which has been speeded up in the restricted passage of the venturi, emerges from the venturi, it strikes the egg-shaped or stream-lined baffle 38, which is preferably so spaced from the discharge end of the venturi that the greater part of the stream of mixed catalyst and fluid is deflected toward the inner walls of the casing 2 of the chamber 21. The sudden expansion of the fluid as it emerges from the venturi, coupled with the impact of the mixed stream of fluid and solid against the blunt end of the baffle 38, produces considerable turbulence which tends to keep the solid particles entrained in the fluid, but the slowing up of the rate of travel of the stream through the enlarged part of its conduit constituted by the chamber 21 reduces the entraining effect somewhat, especially near the surrounding wall 2. The particles of solid, therefore, which have not been carried on by the stream directly into the upper venturi, together with the more slowly moving parts of the stream against the outer wall 2 tend to be drawn downwardly by the partial vacuum at the opening 25 into the venturi 12 and in this way enter the venturi to be recirculated, the solid particles which are not still entrained sliding down the hopper-like inner face of the partition 20 to be picked up or entrained again by the fluid as it is drawn into the annular opening 25 between the venturi sections 12 and 22.

The streamlining of the baffle 38 tends, by reason of the fact that the axis of the streamlined baffle is in alignment with the entrance into the Venturi section 34, to direct some of the fluid emerging from the lower venturi directly into the upper venturi together with the solid particles entrained therein. This action will be cumulative so that eventually all of the solid particles, including those which have been recirculated, will enter the upper chamber 46 through the upper venturi. As the mixture which travels through the upper venturi emerges therefrom, it strikes the similar baffle 40 in chamber 46 and a part of it is deflected outwardly to be re-circulated and a part travels on into the upper discharge passage 48 in a tube 50 connected to the upper end 4 of the reaction chamber 46. The operation which takes place in chamber 46 is substantially the same as that which took place in the lower chamber 21, the overall result being that a thorough commingling and interaction of the fluid, such as petroleum vapor, and the powdered solid, such as a catalyst to react therewith, is brought about.

Although two reaction or treatment chambers 21 and 46 are shown as provided in the casing 2, it will be understood that the number may be more or less according as it is found necessary or desirable to effect a more or less extensive commingling and interaction of the materials which are taking part in the reaction or physical treatment.

As hereinabove suggested, numerous other uses for the apparatus herein shown will readily occur to those skilled in the arts. For example, the apparatus herein shown could be used in succession in the reduction of metallic oxides, as more fully set forth in my co-pending application Serial No. 335,763, filed May 17, 1940, now Patent No. 2,288,613 of July 7, 1942. In such case the form of the apparatus shown in Figures 1 to 3 would be used to effect the coating and/or impregnation of the iron oxide with carbon obtained by the cracking and/or decomposition of a petroleum hydrocarbon, taking advantage of the catalytic properties of the iron oxide for cracking and decomposing hydrocarbons.

What is claimed as new is:

A method of maintaining finely divided solids in intimate mixture with gases for effecting physical and chemical treatments which comprises passing a stream of gases and solids successively through a plurality of restricted passages separated by enlarged zones wherein a portion of said solids containing said gases separates therefrom, gradually increasing the velocity of the stream of gases and solids during the initial portion of the path of said gases through said restricted passages, thereafter gradually reducing the velocity of the gas stream during its passage through the final portion of said restricted passages and reintroducing solids separated from said gas stream in said enlarged zones into said gas stream while said gases are passing at maximum velocity through said restricted passages to thereby redisperse the solids so separated into said gas stream.

GILBERT D. DILL.